3,231,656
APPARATUS AND METHOD OF PLASTIC
MOLDING
Lawrence D. Ninneman, Toledo, Ohio, assignor to Owens-Illinois Glass Company, a corporation of Ohio
Filed June 30, 1961, Ser. No. 120,995
3 Claims. (Cl. 264—328)

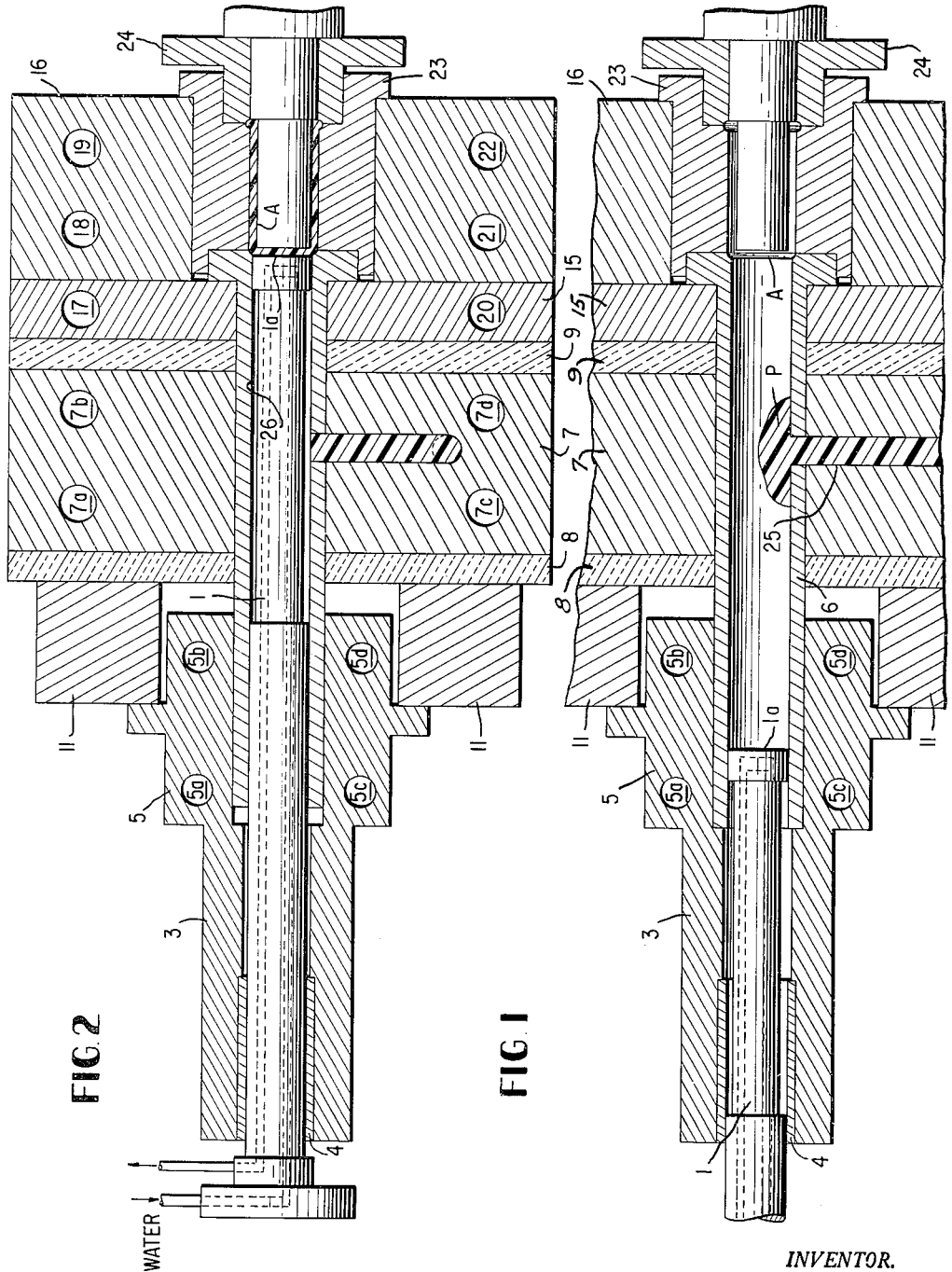

This invention relates to an apparatus and method of injection molding and particularly to an apparatus and method of molding plastic articles.

One of the problems associated with the injection molding of plastic articles has been the tendency of the ram tip to be subjected to high temperatures resulting in the excessive wear thereof. To prevent this condition from occuring, it has been common practice to withdraw the ram tip completely from the heated feed sleeve at the completion of the rearward stroke of the ram tip thereby avoiding an excessive temperature rise of the ram tip while waiting for the next molding cycle to begin. In addition that section of the molding apparatus housing the mold cavity, where the article being molded is given its final shape and form, was spring loaded to separate from the heated feed sleeve when the die opened so as to prevent excessive heat transfer into the cooled cavity. Of course, heat transfer into the ram tip and mold cavity is undesirable since the cooling of the formed plastic article will take longer and consequently the molding cycle will also be increased in time. Moreover, such an arrangement of molding apparatus as described resulted in excessive ram tip wear caused by the necessity of the ram tip, which had been withdrawn from the feed sleeve, re-entering the feed sleeve at high speed, engaging and transferring a measured charge of material into the cavity which must be accurately located in relation to the feed sleeve to permit the ram tip to telescope into the cavity. Accordingly the ram tip must fit the bore of the feed sleeve within .0002 to .0005 of an inch in order to form a part with no external flash. If flash is formed a cleaning operation would have to be instituted to remove it thereby reducing the efficiency and economy of the molding operation.

It is, therefore, an object of this invention to provide a novel apparatus and method of injection molding wherein excessive heating of the ram tip is minimized.

A further object of this invention is to provide a novel apparatus and method of injection molding wherein the resistance to wear of the ram tip is improved.

A further object of this invention is to provide a novel apparatus and method of injection molding wherein the efficiency and economy of the injection molding operation is improved due to reduction in the formation of articles having flash and by maintaining the ram tip at a controlled cooled temperature thereby decreasing cycle time.

A further object of this invention is to provide a novel apparatus and method of injection molding wherein the alignment of the feed sleeve and mold cavity is insured so as to prevent undue wear of the ram tip.

A further object of this invention is to provide a novel apparatus and method of injection molding wherein the normally employed system of telescoping the ram tip into a mold cavity is dispensed with since the feed sleeve in conjunction with the ram tip form the bottom of the article to be molded.

These and other objects will be apparent from the following description and accompanying drawing wherein:

FIG. 1 is a cross-sectional view of the novel apparatus of this invention in which the ram is shown at its most rearward position; and FIG. 2 is a cross-sectional view of the novel apparatus of this invention in which the ram is shown at its most forward position.

Referring to the drawing there is shown in FIGS. 1 and 2 the novel injection molding apparatus of the present invention comprising a ram 1 with ram tip 1a threaded thereon which is reciprocated by conventional hydraulic means (not shown). The first section of the molding apparatus comprises an injection ram bearing support housing 3 which has a bronze bearing 4 and a water cooled member 5 partially enveloping a sleeve feed bushing 6. The second section of the molding apparatus comprises a main feed block 7 heated by conduits 7a, 7b, 7c and 7d separated from platen 11 of the first section by heat insulating pads 8 and from a third section by insulating pad 9. Within block 5 are openings 5a, 5b, 5c and 5d for cooling the same. The third section of the molding apparatus comprises steel plates 15 and 16 which are water cooled by conduits 17, 18, 19, 20, 21 and 22 surrounding mold cavity 23a of mold 23 wherein the plastic article A is given final shape and form and a stripper ring 24. Within feed block 7 is channel 25 which is connected to the extruder (not shown) from which the plastic P is introduced into a bore or chamber 26 defined by feed bushing 6. Means are also provided for circulating cold water within ram 1 so as to insure the cooling of tip 1a.

In operation a predetermined amount of plastic P is discharged into bore 26 by way of feed channel 25. At the beginning of the molding operation the leading face of ram 1 or ram tip 1a is retracted so as to be in the water cooled section 5 as shown in FIG. 1. As the ram 1 is moved quickly forward or to the right, the tip 1a passes into the heated area of bore 26, picks up the plastic mass P, and quickly injects the plastic mass into the mold cavity 23a to form the desired plastic article. In so doing the ram tip 1a passes through the zone cooled by plates 15 and 16. Accordingly the plastic P is rammed into the mold cavity 23a to form the desired article without deleteriously affecting the ram tip 1a by subjecting the same to high temperatures.

It will thus be apparent that there has been devised a molding appartus in which a plurality of heated and cooled zones are provided whereby the ram tip is not subjected to excessive temperatures and consequently does not undergo excessive wear.

Various modifications can be made in the present apparatus. For example various insulating materials can be employed for the insulating pads 8 and 9. One material which has been found to be particularly suitable for these insulating pads is "Transite" which is the trademark for insulating material by the Johns-Manville Co. It will also be apparent that the present apparatus and method are particularly adapted to the molding of thermoplastic materials or resins of which any of the well known thermoplastic resins can be employed.

While I have described and illustrated preferred embodiments of my invention, I wish it to be understood that I do not intend to be restricted solely thereto, but that I do intend to cover all modifications thereof which would be apparent to one skilled in the art and which come within the spirit and scope of my invention.

I claim:

1. An injection molding apparatus for making plastic articles comprising a ram reciprocably operated within a feed bushing, said bushing comprising a water cooled first section and a heated second section, means for introducing a plastic mass into said second section, said bushing having a third cooled section in seriatim with said first two sections, and said bushing connected to a mold having a cavity in which the articles are formed.

2. The apparatus of claim 1 in which means are provided for heat insulating the heated second section from the cooled first and third sections.

3. A method of injection molding plastic articles by means of a ram wherein wear to the tip of said ram due to high temperatures is reduced, comprising passing said ram tip through a positively cooled zone, contacting a heated plastic mass with said ram tip for the purpose of advancing said mass to a molding cavity, and thereafter quickly moving said ram tip in contact with said plastic mass successively through a cooled zone and directly into a mold cavity where the article assumes its final form.

References Cited by the Examiner

UNITED STATES PATENTS

| | | | |
|---|---|---|---|
| 2,131,319 | 9/1938 | Greenboltz et al. | 18—30 |
| 2,322,200 | 6/1943 | Tucker | 18—30 |
| 2,890,491 | 6/1959 | Hendry | 18—30 |
| 3,092,440 | 6/1963 | Rex et al. | 264—328 |

ROBERT F. WHITE, *Primary Examiner.*

ALEXANDER H. BRODMERKEL, *Examiner.*